United States Patent
Chen et al.

(10) Patent No.: US 8,644,031 B2
(45) Date of Patent: Feb. 4, 2014

(54) FLEXIBLE DISPLAY DEVICE

(75) Inventors: Jung-Hsiu Chen, Taoyuan County (TW); Chao-Chin Chen, Hsinchu (TW)

(73) Assignee: AniCa Corporation, Xizhi, Taipei County (TW)

( * ) Notice: Subject to any disclaimer, the term of this patent is extended or adjusted under 35 U.S.C. 154(b) by 212 days.

(21) Appl. No.: 12/893,689

(22) Filed: Sep. 29, 2010

(65) Prior Publication Data

US 2011/0205722 A1     Aug. 25, 2011

(30) Foreign Application Priority Data

Feb. 23, 2010  (TW) .................................. 99105212

(51) Int. Cl.
*H05K 7/02*     (2006.01)

(52) U.S. Cl.
USPC .......... 361/807; 361/760; 349/153; 174/50.5; 174/539

(58) Field of Classification Search
USPC ........... 361/760.761, 765, 807; 349/153, 156; 174/17.05, 31.5, 50.5, 50.63, 262, 539, 174/554, 564
See application file for complete search history.

(56) References Cited

U.S. PATENT DOCUMENTS

| | | | |
|---|---|---|---|
| 5,742,006 A | | 4/1998 | Grupp et al. |
| 6,124,917 A | * | 9/2000 | Fujioka et al. ................ 349/153 |
| 6,559,918 B1 | | 5/2003 | Lueder |
| 7,030,423 B2 | * | 4/2006 | Chang et al. .................... 257/98 |
| 7,154,578 B2 | * | 12/2006 | Kim .............................. 349/153 |
| 7,884,914 B2 | * | 2/2011 | Chen et al. .................... 349/153 |
| 7,898,632 B2 | * | 3/2011 | Yokokawa et al. ............ 349/153 |
| 2006/0291034 A1 | * | 12/2006 | Patry et al. .................... 359/296 |
| 2007/0002266 A1 | * | 1/2007 | Seo et al. ....................... 349/158 |
| 2008/0252839 A1 | * | 10/2008 | Nakadaira .................... 349/153 |
| 2009/0115942 A1 | | 5/2009 | Watanabe |
| 2009/0283290 A1 | * | 11/2009 | Shimoi et al. ................ 174/50.5 |
| 2009/0290117 A1 | | 11/2009 | Watanabe et al. |
| 2009/0302344 A1 | * | 12/2009 | Inoguchi ......................... 257/98 |
| 2010/0053512 A1 | * | 3/2010 | Taniguchi et al. ............. 349/106 |
| 2010/0118250 A1 | * | 5/2010 | Fujikawa ....................... 349/139 |
| 2010/0231840 A1 | * | 9/2010 | Saida et al. .................... 349/153 |

* cited by examiner

*Primary Examiner* — Hoa C Nguyen
(74) *Attorney, Agent, or Firm* — Rabin & Berdo, P.C.

(57) ABSTRACT

A flexible display device is provided. The flexible display device includes a flexible plate, a display unit and a sealant. The flexible plate has a concave. The display unit is disposed in the flexible plate and adjacent to the concave. The sealant is formed in the concave and covers the side of the display unit.

4 Claims, 2 Drawing Sheets

FLEXIBLE DISPLAY DEVICE

This application claims the benefit of Taiwan application Serial No. 99105212, filed Feb. 23, 2010, the subject matter of which is incorporated herein by reference.

BACKGROUND OF THE INVENTION

1. Field of the Invention

The invention relates in general to a flexible display device, and more particularly to a flexible display device whose plate has a concave.

2. Description of the Related Art

Most flexible display devices are very thin, and the peripheral of the display unit of the flexible display device is normally wrapped by a sealant for fixing and protecting the display unit.

Since the display unit is very thin, the sealant often overflows, spoiling the aesthetics of the product or affecting subsequent processing or the assembly of modules. When severe overflowing occurs, the sealant may even overflow to the display region, affecting the display quality of the display unit.

SUMMARY OF THE INVENTION

The invention is directed to a flexible display device. A concave is formed on a flexible plate of the flexible display device, and a portion of the sealant of the flexible display device is formed in the concave to avoid the sealant overflowing.

According to a first aspect of the present invention, a flexible display device is provided. The flexible display device includes a flexible plate, a display unit and a sealant. The flexible plate has a concave. The display unit is disposed on the flexible plate and adjacent to the concave. The sealant is formed in the concave and covers the side of the display unit.

According to a second aspect of the present invention, a flexible display device is provided. The flexible display device includes a flexible plate, a display unit, a protection film and a sealant. The flexible plate has a concave. The display unit is disposed on the flexible plate and adjacent to the concave. The protection film covers the portion of the display unit exposed from the flexible plate. The sealant is formed in the concave and covers the side of the protection film.

The above and other aspects of the invention will become better understood with regard to the following detailed description of the preferred but non-limiting embodiment (s). The following description is made with reference to the accompanying drawings.

DETAILED DESCRIPTION OF THE INVENTION

First Embodiment

Figure 1:
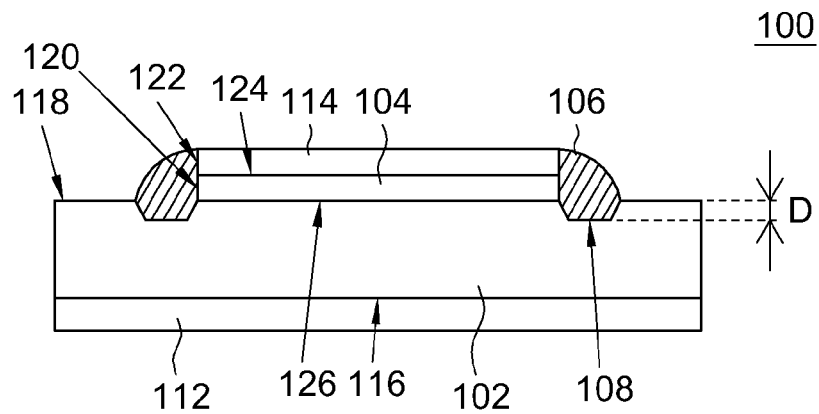
FIG. 1 shows a cross-sectional view of a flexible display device according to a first embodiment of the invention.

Referring to FIG. 1, a cross-sectional view of a flexible display device according to a first embodiment of the invention is shown. The flexible display device 100 includes a flexible plate 102, a display unit 104, a sealant 106, a control circuit (not illustrated), a protection film 114 and a separation film 112. The control circuit controls the flexible plate 102 and the display unit 104 to display a frame.

The separation film 112 is disposed on the plate surface 116 of the flexible plate 102 to avoid the circuit (not illustrated) on the flexible plate 102 and the display unit 104 being damaged by the atmospheric environment. The separation film 112 can be made from metal, plastics, water-proof membrane or polymer, wherein examples of the metal include aluminum and copper. The protection film 114, disposed on the second surface 124 of the display unit 104, can be realized by such as a water-proof membrane anti-glare film or a scratch resistant film.

The flexible plate 102 has a concave, which can be realized by a ringlike groove 108 surrounding the display unit 104. The groove 108, which can be realized by a close, ringlike groove, may include a plurality of grooves separately surrounding the display unit 104. The depth D of the groove 108 preferably but not limitedly ranges between 8 and 150 micrometers (μm). In addition, the cross-section of the groove 108 can be a rectangle, but such exemplification is not for limiting the invention. In other implementations, the cross-section of the groove 108 can be an arc, or a polygon, and the invention does not have any restrictions regarding the shape of the cross-section of the groove 108.

The display unit 104 is disposed on the flexible plate 102 with the first surface 126 being opposite to the second surface 118 of the plate surface 116, and is adjacent to the groove 108.

In the present embodiment of the invention, since a portion of the sealant 106 can appropriately cover the side 120 of the display unit 104 and the side 122 of the protection film 114, the other portion of the sealant 106 is formed in the groove 108, lest the other portion of the sealant 106 might overflow to a region overlapping the second surface 124 of the display unit 104.

The flexible display device 100 has bi-stable or multi-stable states, so that the flexible display device can temporarily sustain the display contents when power supply is cut off. For example, the flexible display device 100 can be realized by an electrophoresis type display device, a cholesterol liquid crystal display device, a liquid crystal display device, a bi-stable display device or a multi-stable display device. In addition, the flexible display device 400 can further be realized by a flexible organic light-emitting diode (OLED) display device, a flexible light-emitting diode (LED) display device or a flexible liquid crystal display device. Moreover, the flexible display device 100 can further be realized by a segment type display device, a dot matrix type display device or a pattern type display device.

In the present embodiment of the invention, the flexible display device 100 is exemplified by an electrophoresis type display device, and the display unit 104 and the flexible plate 102 can be appropriately selected or designed in accordance with the variety of the flexible display device 100.

The flexible plate 102 can be realized by such as a flexible printed circuit board (FPCB). The flexible printed circuit board can be made from a copper substrate such as PI, FR4, FR5, PET, PVC, PEN, and PCB. The flexible plate 102 can further be an organic thin film transistor (OTFT). Or, the flexible plate 102 may further form an electrode pattern matching with the display unit 104 to display a particular frame such as an electronic label. Furthermore, the flexible plate 102 of the flexible display device 100 may further be formed by way of printing, epoxy, carbon ink printing or circuit etching.

In the present embodiment of the invention, the flexible display device 100 includes a protection film 114. However, in other implementations, the protection film 114 can be omitted. Under such circumstance, when the original groove is used and/or the size of the groove 108 is appropriately designed, the distribution of the sealant 106 still can be controlled to avoid the problem of overflowing.

Second Embodiment

Figure 2:
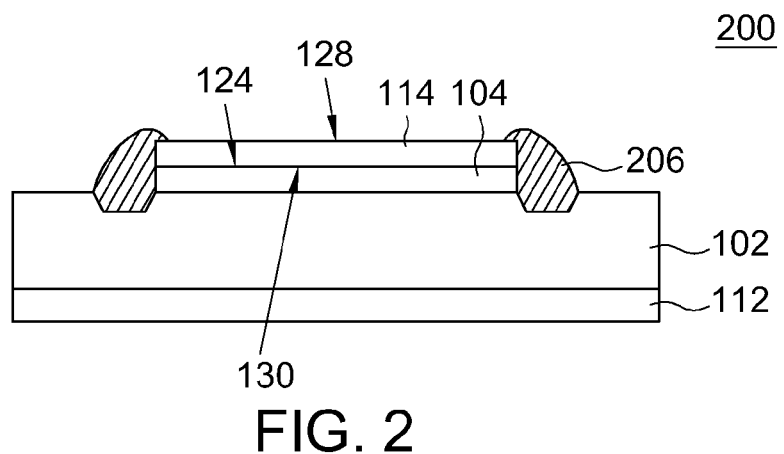
FIG. 2 shows a cross-sectional view of a flexible display device according to a second embodiment of the invention.

Referring to FIG. 2, a cross-sectional view of a flexible display device according to a second embodiment of the invention. As for the similarities between the second embodiment and the first embodiment, the same designations are used and the similarities are not repeated here. The flexible display device 200 of the second embodiment is different from the flexible display device 100 of the first embodiment in that: the sealant 206 of the flexible display device 200 covers the peripheral of the fourth surface 128 of the protection film 114. The protection film 114 is disposed on the display unit 104 by the third surface 130 opposite to the fourth surface 128.

Due to the groove 108, the sealant 206 only covers the peripheral of the fourth surface 128 of the protection film 114, and will overflow to the display region (not illustrated) of the display unit 104.

Third Embodiment

Figure 3:
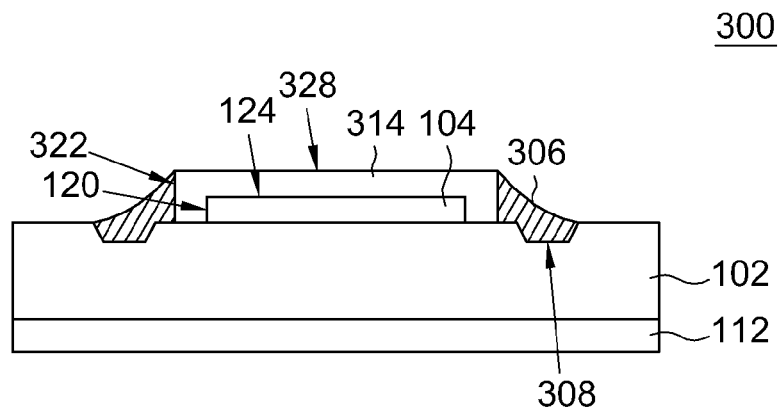
FIG. 3 shows a cross-sectional view of a flexible display device according to a third embodiment of the invention.

Referring to FIG. 3, a cross-sectional view of a flexible display device according to a third embodiment of the invention is shown. As for the similarities between the third embodiment the first embodiment, the same designations are used and the similarities are not repeated here. The flexible display device 300 of the third embodiment is different from the flexible display device 100 of the first embodiment in that: the protection film 314 of the flexible display device 300 covers the portion of the display unit 104 exposed from the flexible plate 102. That is, the protection film 314 covers the second surface 124 and the side 120 of the display unit 104.

The sealant 306 of the flexible display device 300 is formed in groove 308 and covers the side 322 of the protection film 314. The groove 308 is similar to the groove 108 of the first embodiment, and is not repeated here.

Figure 4:
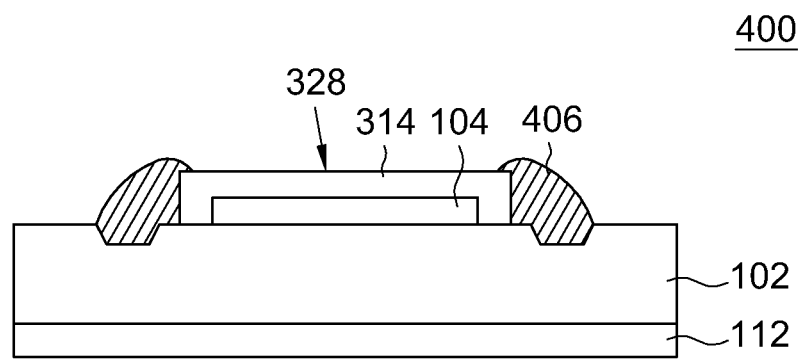
FIG. 4 is a cross-sectional view showing a sealant of a flexible display device of another embodiment of the invention further formed on a fourth surface of a protection film.

In the present embodiment of the invention, the sealant 306 is not formed on the fourth surface 328 of the protection film 314. Referring to FIG. 4, a cross-sectional view showing a sealant of a flexible display device of another embodiment of the invention further formed on a fourth surface of a protection film. In the other embodiment, a portion of the sealant 406 of the flexible display device 400 covers the peripheral of the fourth surface 328 of the protection film 314.

Due to the groove 308, the sealant 406 is controlled to be disposed in appropriate position, that is, the sealant 406 only covers the peripheral of the fourth surface 328 of the protection film 314, and will not overflow to the display region (not illustrated) of the display unit 104.

The disposition of the sealant of the invention can be implemented in many ways. For example, the sealant can only cover the side of the display unit or the side of the protection film. Or, the sealant can cover the side of the display unit or the side of the protection film, and further covers the peripheral of the second surface of the display unit or the peripheral of the fourth surface of the protection film.

Fourth Embodiment

Figure 5:
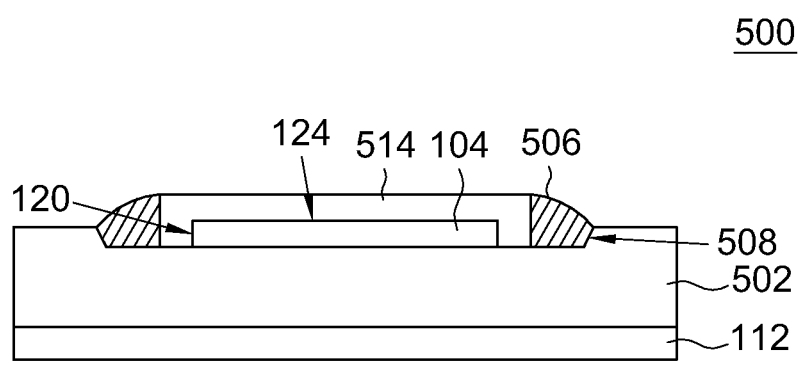
FIG. 5 shows a cross-sectional view of a flexible display device according to a fourth embodiment of the invention.

Referring to FIG. 5, a cross-sectional view of a flexible display device according to a fourth embodiment of the invention is shown. As for the similarities between the fourth embodiment the first embodiment, the same designations are used and the similarities are not repeated here. The flexible display device 500 of the fourth embodiment is different from the flexible display device 100 of the first embodiment in that: the flexible plate 502 of the flexible display device 500 has a concave, such as a recess 508 in which the display unit 104 and the protection film 314 are disposed.

The sealant 506 can be similar to the sealant 106, 206, 306 or 406, and is not repeated here.

In the present embodiment of the invention, the protection film 514 only covers the second surface 124 and the side 120 of the display unit 104. In another implementation, the protection film 514 can only cover the second surface 124 of the display unit 104. Or, in another implementation, the flexible display device 500 can omit the protection film 514.

According to the flexible display device of the above embodiments of the invention, a concave is formed on the flexible plate, a portion of the sealant can appropriately cover at least one of the display unit and the protection layer, and the other portion of the sealant is formed in the concave, so that the distribution of the sealant can be controlled lest the sealant might overflow to an unexpected region.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A flexible display device, comprising:
 a flexible plate having a concave, wherein the concave is a recess;
 a display unit disposed within the concave, wherein a sidewall of the concave is outwardly extended to an upper surface of the flexible plate from a bottom of the concave;
 a sealant formed in the concave and covering the side of the display unit; and
 a protection film that has a first surface and a second surface opposite to the first surface, the protection film being disposed on the display unit by the first surface, and the sealant covering a peripheral of the second surface of the protection film.

2. The flexible display device according to claim 1, wherein the display unit has a third surface and a fourth surface opposite to the third surface, the display unit is disposed on the flexible plate by the third surface, and the flexible display device further comprises:
 the protection film disposed on the fourth surface of the display unit;
 wherein, the sealant further covers the side of the protection film.

3. The flexible display device according to claim 1, wherein the flexible plate has a plate surface opposite to the concave, and the flexible display device further comprises:

a separation film disposed on the plate surface to avoid the flexible plate being damaged by external environment.

4. The flexible display device according to claim 1, wherein the sidewall of the concave is inclined.

* * * * *